US006477011B1

(12) United States Patent
Hsiao et al.

(10) Patent No.: US 6,477,011 B1
(45) Date of Patent: Nov. 5, 2002

(54) MAGNETIC RECORDING DEVICE HAVING AN IMPROVED SLIDER

(75) Inventors: Richard Hsiao, San Jose; Son Van Nguyen, Los Gatos; Andrew Chiuyan Ting; John David Westwood, both of San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/138,770

(22) Filed: Aug. 24, 1998

(51) Int. Cl.$^7$ ................................................ G11B 5/60
(52) U.S. Cl. ................................................... 360/235.1
(58) Field of Search ............................. 360/103, 235.1, 360/122, 325, 326, 323, 320, 327, 97.01, 235.3; 428/64.1, 64.2, 64.3, 65.1, 65.4, 65.5

(56) References Cited

U.S. PATENT DOCUMENTS

| | | | | |
|---|---|---|---|---|
| 4,413,860 A | * | 11/1983 | Prescott | 301/64.7 |
| 4,614,445 A | | 9/1986 | Gerkema et al. | 384/368 |
| 4,697,543 A | | 10/1987 | Abbott et al. | 118/412 |
| 4,863,809 A | | 9/1989 | Brar et al. | 428/623 |
| 4,894,740 A | | 1/1990 | Chhabra et al. | 360/103 |
| 5,153,044 A | * | 10/1992 | Chen et al. | 428/65.5 |
| 5,159,508 A | | 10/1992 | Grill et al. | 360/103 |
| 5,210,673 A | * | 5/1993 | Ito et al. | 360/135 |
| 5,219,651 A | * | 6/1993 | Shoji et al. | 428/323 |
| 5,223,342 A | * | 6/1993 | Shoji et al. | 428/413 |
| 5,227,211 A | * | 7/1993 | Eltoukhy et al. | 428/65.4 |
| 5,240,774 A | * | 8/1993 | Ogawa et al. | 428/411.1 |
| 5,323,283 A | * | 6/1994 | Sano | 360/103 |
| 5,336,550 A | | 8/1994 | Ganapathi et al. | 428/216 |
| 5,438,467 A | | 8/1995 | Dorius et al. | 360/103 |
| 5,485,327 A | | 1/1996 | Yanagisawa | 360/97.02 |
| 5,540,966 A | * | 7/1996 | Hintz | 428/64.1 |
| 5,543,203 A | * | 8/1996 | Tani et al. | 428/156 |
| 5,580,633 A | * | 12/1996 | Kuwahara et al. | 428/64.3 |
| 5,609,948 A | | 3/1997 | David et al. | 428/216 |
| 5,612,838 A | * | 3/1997 | Smith et al. | 360/102 |
| 5,614,314 A | | 3/1997 | Itoh et al. | 428/332 |
| 5,654,850 A | | 8/1997 | Ganapathi et al. | 360/103 |
| 5,656,370 A | * | 8/1997 | Murkami et al. | 428/332 |
| 5,661,618 A | | 8/1997 | Brown et al. | 360/97.02 |

(List continued on next page.)

OTHER PUBLICATIONS

V. S. Nguyen et al., "The Variation of Physical Properties of Plasma–Deposited Silicon Nitride and Oxynitride with Their Compositions," Journal of the Electrochemical Society, vol. 131, No. 10, Oct. 1984, pp. 2348–2353.

A. Grill et al., "Novel Low k Dielectrics Based on Diamondlike Carbon Materials," Journal of the Electrochemical Society, vol.145, No. 5, May 1998, pp. 1649–1653.

S. J. Limb et al., "Growth of flourocarbon polymer thin films with high CF2 fractions and low dangling bond concentrations by thermal chemical vapor deposition", Appl. Phys. Lett. 68(20), May 13, 1996, pp 2810–2812.

Primary Examiner—Robert S. Tupper
Assistant Examiner—Franklin D. Altman, III
(74) Attorney, Agent, or Firm—Robert B. Martin

(57) ABSTRACT

The invention relates to a magnetic recording device comprising (a) a disk comprising a substrate, a metallic magnetic layer, a carbon layer and a lubricant layer; (b) a motor associated with a disk operable for rotating the disk; (c) a head supported on an air bearing slider for magnetically reading data to or magnetically writing data from the magnetic layer on the disk, the trailing surface of the slider coated with a multilayered film having low surface energy; and (d) an actuator connected to the slider for moving the head across the disk. The multilayered film on the trailing surface of the slider substantially reduces stiction of the slider.

9 Claims, 1 Drawing Sheet

U.S. PATENT DOCUMENTS

| | | | |
|---|---|---|---|
| 5,781,376 A | * 7/1998 | Tsukamoto | 360/103 |
| 5,781,377 A | * 7/1998 | Koka et al. | 360/103 |
| 5,808,832 A | * 9/1998 | Chen et al. | 360/103 |
| 5,830,332 A | * 11/1998 | Babich et al. | 204/192.15 |
| 5,876,824 A | * 3/1999 | Noguchi et al. | 428/65.3 |
| 5,914,152 A | * 6/1999 | Endo et al. | 427/128 |
| 5,930,077 A | * 7/1999 | Obata et al. | 360/103 |
| 5,958,542 A | * 9/1999 | Ootake et al. | 428/65.3 |
| 5,981,014 A | * 11/1999 | Tsukagoshi et al. | 428/64.1 |
| 5,985,403 A | * 11/1999 | Nakakawaji et al. | 428/65.3 |
| 5,986,851 A | * 11/1999 | Angelo et al. | 360/103 |
| 5,989,669 A | * 11/1999 | Usami | 428/64.1 |
| 5,997,977 A | * 12/1999 | Zou et al. | 428/64.1 |
| 5,999,368 A | * 12/1999 | Katayama | 360/103 |
| 6,001,479 A | * 12/1999 | Yokasawa et al. | 428/408 |
| 6,014,288 A | * 1/2000 | Cha et al. | 360/103 |
| 6,020,042 A | * 2/2000 | Paulus et al. | 428/64.1 |
| 6,023,840 A | * 2/2000 | Chen et al. | 29/603.12 |
| 6,030,678 A | * 2/2000 | Aratani | 428/64.1 |
| 6,030,679 A | * 2/2000 | Saito et al. | 428/64.1 |
| 6,030,680 A | * 2/2000 | Hahn et al. | 428/64.1 |
| 6,063,470 A | * 5/2000 | Zou et al. | 428/64.2 |
| 6,074,566 A | * 6/2000 | Hsaio et al. | |

* cited by examiner

MAGNETIC RECORDING DEVICE HAVING AN IMPROVED SLIDER

BACKGROUND OF THE INVENTION

1. Field of the Invention

The present invention relates to a magnetic recording device having an improved slider.

2. Description of the Background Art

Digital magnetic recording devices for data storage generally comprise a thin film magnetic recording disk and a head or transducer which is moved along or above the surface of the rotating disk to electromagnetically read and write information on the disk. Advanced thin film magnetic recording disks comprise a rigid substrate, a magnetic layer such as a cobalt-based metal alloy, a protective amorphous carbon layer and a lubricant layer, such as a perfluoropolyether disposed on the carbon overcoat.

During operation of the disk drive system, an actuator mechanism moves the magnetic transducer to a desired radial position on the surface of the rotating disk where the head electromagnetically reads or writes data. Usually, the head is integrally mounted in a carrier or support referred to as a "slider". A slider generally serves to mechanically support the head and any electrical connections between the head and the rest of the disk drive system. The slider is aerodynamically shaped to glide over moving air and, therefore, to maintain a uniform distance from the surface of the rotating disk, thereby preventing the head from undesirably contacting the disk.

Some disk substrates have a dual zone texture which comprises a highly polished surface over the area of the disk used for reading and writing data, and a textured surface over the area of the disk used for landing the head when the recording device is not in use. The highly polished surface of the "data zone" functions to: a) minimize interactions between the surface of the disk and head and b) reduce the number of errors encountered during reading and writing operations. The textured "landing zone" and its presence is desired to eliminate stiction upon file start-up. Stiction is the tendency of a landed stationary magnetic recording head to resist movement, e.g., translational movement along the surface of the disk. High stiction can lead to mechanical failure of the head or disk.

U.S. Pat. No. 5,661,618 by Brown et al. discloses that during operation of a recording device at higher RPM, liquid contaminates condense on the trailing edge of a slider. When the slider stops on the surface of the disk, even in a textured landing zone, these liquid contaminants can bridge onto the disk to create significant stiction for the slider. In order to overcome the problem, Brown teaches coating the trailing edge of the slider with a thin organic film having a low surface energy less than 25 ergs/cm$^2$ to minimize any condensation of contaminates on the trailing edge of the slider during operation of the recording device. In manufacturing, the organic film was generally applied at the slider row level and in some cases, subsequent manufacturing process steps degraded the film thereby increasing its surface energy and substantially decrease its effectiveness in reducing stiction. Therefore, there is still a need in the art for a magnetic recording device having improved resistance to stiction.

It is an object of the present invention to provide a magnetic recording device with a slider having a more robust low surface energy trailing edge. Other objects and advantages will be apparent from the following disclosure.

SUMMARY OF THE INVENTION

The present invention relates to a magnetic recording device comprising (a) a disk comprising a substrate, a metallic magnetic layer, a carbon layer and a lubricant layer; (b) a motor associated with a disk operable for rotating the disk; (c) a head supported on an air bearing slider for magnetically reading data from or magnetically writing data to the magnetic layer on the disk, the trailing surface of the slider coated with a multilayered film having a surface energy less than 25 ergs/cm$^2$; and (d) an actuator connected to the slider for moving the head across the disk.

The multilayered film on the trailing surface of the slider preferably comprises three layers: (a) a silicon containing layer disposed on the slider, (b) a carbon containing layer disposed on the silicon layer, and (c) a fluorocarbon layer disposed on the carbon layer. Suitably the multilayered film can be beam deposited (e.g., plasma) onto the trailing surface of the slider.

A more thorough disclosure of the present invention is presented in the detailed description which follows and the accompanying figures.

DETAILED DESCRIPTION OF THE INVENTION

The present invention relates to an improved high performance digital magnetic recording device for reading and writing data magnetically.

Figure 1:
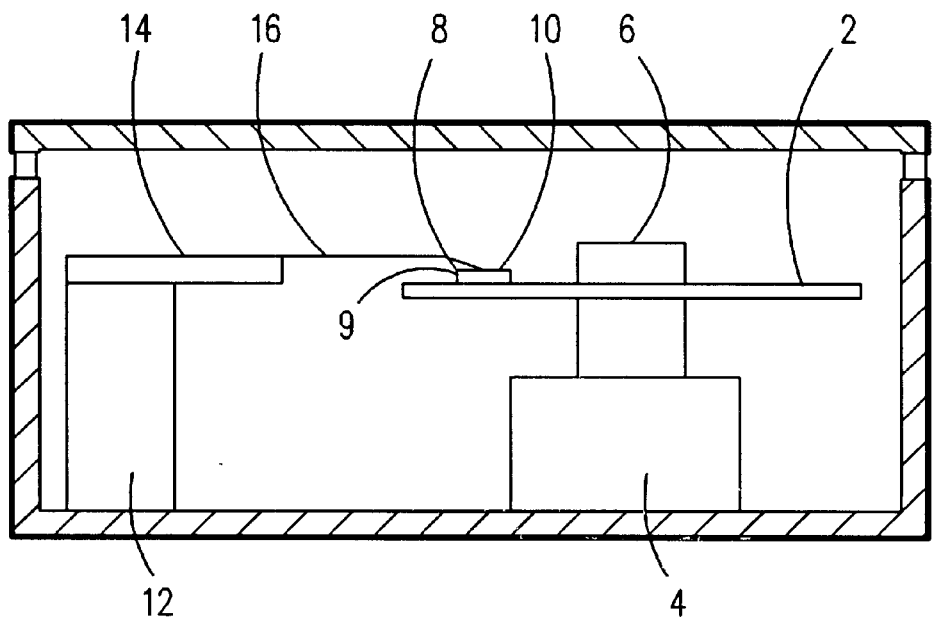
FIG. 1 is a section view of the magnetic recording disk drive.
Figure 2:
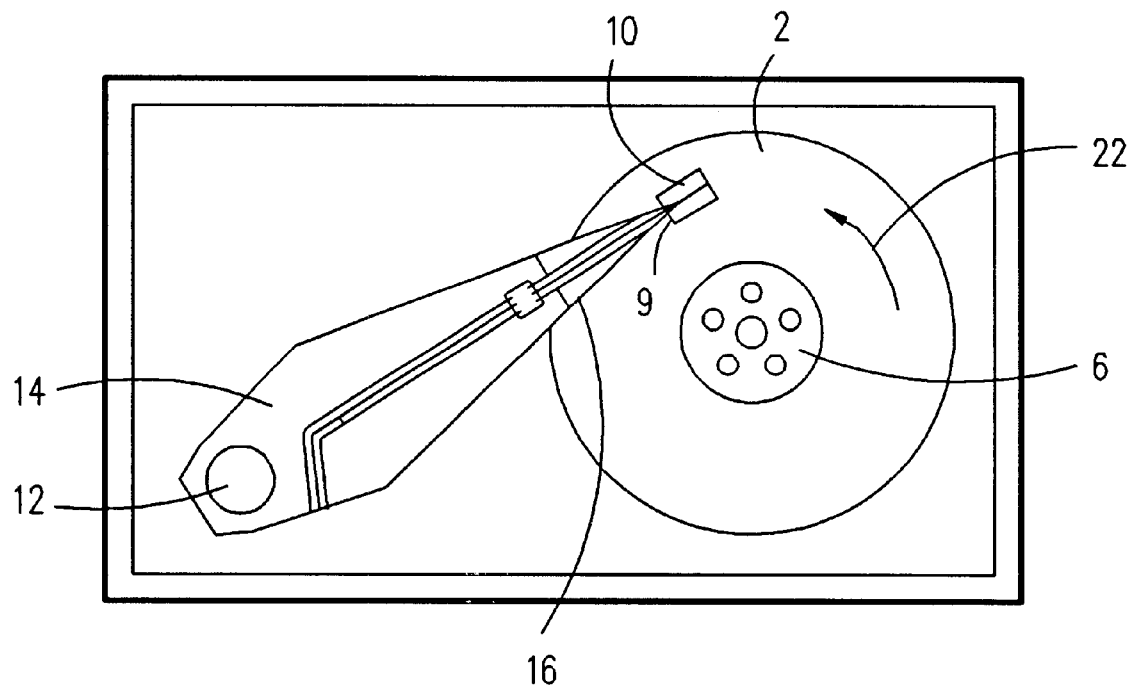
FIG. 2 is a top view of the magnetic recording disk drive.

Referring the FIGS. 1 and 2, there is shown a magnetic recording disk drive of the present invention. The magnetic recording disk 2 is rotated by drive motor 4 with hub 6, which is attached to the drive motor. The disk comprises a substrate, a metallic magnetic layer, a carbon layer and a polymeric lubricant layer, e.g., perfluoropolyether.

A read/write head or transducer 8 is formed on the trailing end of a slider, or slider 10. Suitable sliders are positive or negative air bearing sliders. Suitable negative air bearing sliders are disclosed in U.S. Pat. Nos. 4,894,740 and 5,438,467, the disclosures of which are incorporated herein by reference. The slider 10 has trailing edge 9. Head 8 may be an inductive read and write transducer or an inductive write transducer with a magnetoresistive read transducer. The slider 10, is connected to the actuator 12 by means of a rigid arm 14 and a suspension 16. The suspension 16 provides a bias force which urges the slider 10 onto the surface of the recording disk 2.

During operation of the disk drive, the drive motor 4 rotates the disk 2 at a constant speed in the direction of arrow 22, and the actuator 12, which is typically a linear or rotary motion coil motor, moves the slider 10 generally radially across the surface of the disk 2 so that the read/write head may access different data tracks on disk 2.

The multilayered, low surface energy film is disposed on the vertical trailing surface 9 of the ceramic slider. The film preferably comprises three layers. The first layer of the film is a silicon containing layer. Preferably the silicon containing layer comprises silicon, nitrogen and oxygen, e.g., silicon oxy-nitride ($SiO_xN_y$). The silicon layer is preferably about 10 Å to 600 Å thick. Suitable silicon containing layers are known in the art such as disclosed in Nguyen et al., J. of Electrochem. Soc., V.131, 2348 (1984), the disclosure of which is incorporated herein by reference for all purposes.

The second layer is a carbon containing layer. The layer is preferably an amorphous carbon layer. The carbon layer is preferably about 20 Å to 300 Å thick. Suitable carbon containing layers are known in the art such as disclosed in Grill et al., J. of Electrochem. Soc., V.145, 1649 (1998), the disclosure of which is incorporated herein by reference for all purposes.

The third layer is a fluorocarbon layer. A suitable fluorocarbon layer preferably has a contact angle with water of greater than 80° C. and is stable up to about 250° C. Suitable fluorocarbon layers and methods of deposition are disclosed in Brown et al. U.S. Pat. No. 5,661,618, the disclosure of which is incorporated herein by reference for all purposes. The fluorocarbon layer is preferably about 1000 Å to 1000 Å thick. Suitable fluorocarbon layers include fluorinated benzene, acrylates/methacrylates and alkanes such as polytetrafluoroethylene, polyhexafluoropropylene, and poly (fluoroalkylmethacrylate). In alternative embodiments, the multilayered film can comprise additional layers such as a layer of silicon disposed between the carbon containing layer and the silicon containing layer.

The three layers are preferably beam deposited preferably plasma deposited. The three layers are preferably deposited sequentially in a chamber without breaking vacuum.

The film deposition is suitably performed on the wafer after the processing to form the magnetic recording heads is completed. The film is preferably deposited using a commercial plasma enhanced chemical vapor deposition (200 mm system with 13.56 MHz RF). The substrate temperature is suitably maintained below 200° C. during the deposition process to avoid degradation of the shields, poles and sensor magnetic properties of the recording head (e.g., anistropic magnetoresistance (AMR) and giant magnetoresistance (GMR) heads). The films are suitably deposited sequentially using (i) $SiH_4/NH_3/N_2O$(or $O_2$) reactants for the silicon containing layer, e.g., $SiN_xO_y$; (ii) or $CH_4/Ar$, or $C_2H_4/Ar$ reactants for carbon layer; and (iii) $C_3F_8/CH_4/Ar$ for fluorocarbon layer.

The table below shows a typical deposition process condition, with temperature=150° C. to 200° C.

| Layer | Thickness (typical) | Pressure | Gas Flow (typical) | RF power (w) | Deposition Rate |
|---|---|---|---|---|---|
| $SiN_yO_y$ | 50–500 Å | 0.5–2 Torr | $SiH_4$ = 100 sccm<br>$NH_3$ = 200 sccm<br>$N_2O$ = 20–100 sccm | 300–500 w | 3,000 Å/min |
| a-C | 20–200 Å | 1 Torr | $CH_4$ = 300 sccm<br>Ar = 300 sccm | 500 w | ~5000 Å/min |
| a-$CF_x$ | 3000–5000 Å | 1 Torr | $C_2F_8$-50–300 sccm<br>$CH_4$ = 20–100 sccm<br>Ar = 100 sccm | 150–200 w | 1500–3400 Å/min |

After film deposition, photoresist is applied to the wafer and patterned to expose the device pads which will function as electrical connections for the recording head. The photoresist protects the film in the subsequent process. The film is removed from the device pads by oxygen reactive ion etching (RIE). The photoresist thickness and RIE conditions are chosen so that several microns of resist thickness remain on the wafer after RIE. This step leaves the bare metal device pads exposed as required to wire the device. The remaining photoresist is then removed from the wafer with n-methyl-pyrolidone (NMP).

The wafer with many fabricated recording heads is then cut into rows, polished, patterned, parted into sliders and subsequently mounted into a head gimbel assembly (HGA). The slider now has a robust, low surface energy layer at the training edge of the slider which will prevent droplet formation during operation. The droplet inhibition is due to the low surface energy of the permanent low surface energy layer.

The film of the present invention withstands subsequent head manufacturing process steps without any unacceptable degradation of the film.

The following examples are detailed descriptions of the present invention. The detailed descriptions fall within the scope of, and serve to exemplify, the more generally described invention set forth above. The examples are presented for illustrative purposes only, and are not intended as a restriction on the scope of the invention.

The permanent low surface energy film is deposited by a plasma assisted chemical vapor deposition process. An important aspect of the process is depositing the film at a temperature ($\leq 200°$ C.) so that it does not effect the MR sensor and is to subsequent processing steps.

EXAMPLE I

Fluorocarbon films are deposited by plasma enhanced chemical vapor deposition process in a parallel plate 200 mm radius electrode using 13.56 MHz RF. The reactant gases are $C_4F_8$ (50–300 sccm) and $CH_4$ (25–100 sccm). The films are deposited at 180° C., 100–150 w RF power, 1 Torr pressure and 0.75 cm electrode spacing. Prior to F—$C_x$ film deposition, two adhesion layers (silicon oxy-nitride and a-carbon) are deposited onto the fabricated $Al_2O_3/TiC_3$ magnetoresistance slider wafer. The first layer is plasma deposited silicon oxynitride film using $SiH_4$ (1.8% in $H_e$, 1500 sccm) $NH_3$ (90 sccm), $N_2O$ (8–18 sccm) at 180° C., 1.2 Torr pressure, and 400 w RF power to form a film having a thickness of 200 Å–500 Å. The second layer is a-carbon which is deposited in the same reactor using 300 sccm $CH_4$, 500 w RF power, at a thickness of 50 Å–100 Å.

The total composited film is:

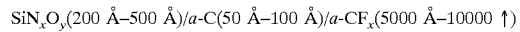

$SiN_xO_y$(200 Å–500 Å)/a-C(50 Å–100 Å)/a-$CF_x$(5000 Å–10000 ↑)

and can be deposited sequentially in the same reactor.

EXAMPLE II

Fluorocarbon film can also be deposited in a high density inductive couple 200 mm radius plasma deposition system using 2.0 MHz induction coil and 13.56 MHz RF bias. Just as in Example I, both silicon oxynitride and a-carbon film are used as adhesion layers prior to the F—$C_x$ deposition. The deposition conditions and thickness of these adhesion layers are the same as in Example I. For high density plasma CVD F—$C_x$ film deposition, various combinations of fluorocarbon gases ($CF_4, C_2F_6, C_4F_8$=10–300 sccm) and hydrocarbon gases ($CH_4, C_2H_2$=10–400 sccm), and hydrogen ($H_2$=10–50 sccm) can be used in combination as reactant gas. The deposition process pressure range is from 1–200 mTorr at 150° C.–180° C., substrate temperature. The inductive source RF power of 2000–4500 watts and the low RF bias of 20–500 watts range are used for the film deposition on the fabricated MR recording head wafer. The deposition rate at these process conditions range from 400 Å to 5000 Å/min. At high RF bias power (>200 watts), the deposition rate is lower.

EXAMPLE III

In another process, fluorocarbon films are deposited onto a fabricated device wafer, using a multi-wafer parallel plate system using Ar (250–500 sccm) and hexa-fluorobenzene ($C_6F_6$)=15–30 sccm at 1 Torr pressure at 180° C. substrate temperature. This plasma deposition system has dual frequencies of 13.56 MHz (upper electrode) and 200 KHz (low electrode) and both operating at 100–150 watts range. The deposition rate ranges from 3500 Å–4000 Å/min. Both of the silicon oxynitride and a-carbon films are also used as adhesion layers (as in Example I) prior to fluorocarbon film deposition.

Film Analysis and Result

All deposited low surface energy films are analyzed by ellipsometric measurement (623 nm) for thickness and refractive index, stress measurement, compositional analysis (Auger, ESCA), and contact angle measurement (with $H_2O$). Hydrogen concentration in the film is measured by the Rutherford Backscattering (RBS) method.

The fluorocarbon films suitably have refractive indices between 1.43 and 1.54, stress between $+1\times10^9$ dynes/cm$^2$ and $-5\times10^8$ dynes/cm$^2$ and contact angle between approximately 75° to 100° before and after the slider fabrication processing.

The fluorocarbon films suitably have a fluorine/carbon ratio between 0.20 to 0.5 range and hydrogen concentration less than 35 atomic per cent.

Slider Test Results

After the slider is fabricated, the surface of the fluorocarbon films at the deposited end (trailing edge) can be further enhanced (i.e., surface activation energy reduction, aka. contact angle reduction) by exposing the fabricated slider to regular or high density plasma hydrogen and $CHF_3$/Ar for about five seconds. The activated surface with more —$CF_2$ bonding group will have higher hydrophobic properties.

Operating tests in an atmosphere containing high amounts of hydrocarbon vapor show no hydrocarbon oil droplet formation at the trailing edge of the slider of the present invention as compared to about 20–40 oil droplets formation normally observed in sliders formed in accordance with the teaching of U.S. Pat. No. 5,661,618.

Although this invention has been described with respect to specific embodiments, the details thereof are not to be constructed as limitations for it will be apparent that various embodiments, changes, and modifications may be resorted to without departing from the spirit and scope thereof, and it is understood that such equivalent embodiments are intended to be included within the scope of this invention.

We claim:

1. A magnetic recording device comprising:
   (a) a disk comprising a substrate, a metallic magnetic layer, a carbon layer and a lubricant layer.
   (b) a motor associated with the disk operable for rotating the disk;
   (c) a head supported on an air bearing slider for magnetically reading data to or magnetically writing data from the magnetic layer on the disk; the vertical trailing surface of the slider coated with a film having a surface energy less than 25 ergs/cm$^2$ and comprising (i) a silicon containing layer disposed on the slider, (ii) a carbon containing layer disposed on the silicon containing layer, and (iii) a fluorocarbon layer disposed on the carbon containing layer; and
   (d) an actuator connected to the slider for moving the head across the disk.

2. The recording device of claim 1 wherein the silicon containing layer comprises silicon oxy-nitride.

3. The recording device of claim 1 wherein the carbon containing layer comprises amorphous carbon.

4. The recording device of claim 1 wherein the fluorocarbon layer comprises fluorinated acrylates, fluorinated methacrylate, fluorinated benzene or fluorinated alkanes.

5. The recording device of claim 4 wherein the fluorocarbon layer comprises polytetrafluoroethylene, polyhexafluoropropylene, or poly(fluoroalkylmethacrylate).

6. The recording device of claim 1 wherein the film further comprises a layer of silicon disposed between the silicon containing layer and the carbon containing layer.

7. The recording device of claim 1 wherein the silicon containing layer has a thickness of about 10 Å to 600 Å.

8. The recording device of claim 1 wherein the carbon containing layer has a thickness of about 20 Å to 300 Å.

9. The recording device of claim 1 wherein the fluorocarbon layer has a thickness of about 1000 Å to 10,000 Å.

\* \* \* \* \*